(12) United States Patent
Hirose et al.

(10) Patent No.: US 6,450,932 B1
(45) Date of Patent: Sep. 17, 2002

(54) SPARE TOOL CHANGING SYSTEM FOR MACHINING CENTER

(75) Inventors: Yoshiro Hirose, Gifu-Ken; Tetsuya Yamada, Kakamigahara, both of (JP)

(73) Assignee: Howa Machinery, Ltd., Aichi-Ken (JP)

( * ) Notice: Subject to any disclaimer, the term of this patent is extended or adjusted under 35 U.S.C. 154(b) by 79 days.

(21) Appl. No.: 09/599,070

(22) Filed: Jun. 20, 2000

(30) Foreign Application Priority Data

Jun. 24, 1999 (JP) ............................................ 11-178626

(51) Int. Cl.[7] ............................................... B23Q 3/157
(52) U.S. Cl. ............................ 483/40; 483/44; 483/49; 483/51
(58) Field of Search ............................. 483/40, 41, 44, 483/46, 48, 49, 50–51, 52–53, 45, 61

(56) References Cited

U.S. PATENT DOCUMENTS

| | | | | |
|---|---|---|---|---|
| 3,073,024 A | * | 1/1963 | Hutchens et al. | 483/51 |
| 3,760,491 A | * | 9/1973 | Zankl et al. | 483/46 |
| 4,121,332 A | * | 10/1978 | Corsi | 483/46 |
| 4,459,737 A | * | 7/1984 | Mori et al. | 438/46 |
| 4,831,714 A | * | 5/1989 | Babel et al. | 483/49 |

FOREIGN PATENT DOCUMENTS

| | | | | |
|---|---|---|---|---|
| JP | 0176723 A | * | 8/1987 | 483/68 |
| JP | 09290339 A | | 11/1997 | |
| JP | 10151539 A | | 6/1998 | |

* cited by examiner

*Primary Examiner*—A. L. Wellington
*Assistant Examiner*—Erica E Cadugan
(74) *Attorney, Agent, or Firm*—Ladas & Parry

(57) ABSTRACT

A guide rail (12) is laid on a frame (4) of a horizontal machining center provided with a tool magazine (5) to guide a tool changer (11) for movement between a tool transfer station near the tool magazine (5) and a tool changing station at a lower part of the frame (4). The guide rail (12) has a horizontal section (12a), a vertical section (12b) and a curved section (12c). The direction of the tool changer (11) is changed while the tool changer (11) is traveling along the curved section (12c). The tool changer (11) carries a spare tool (T) in a horizontal position along the horizontal section (12a) of the guide rail (12) and in a vertical position along the vertical section (12b) of the guide rail (12). The tool changer (11) has a carriage (16) and a tool holding device (17) supported on the carriage (16) so as to be movable in directions perpendicular to the guide rail (12). The tool holding device (17) puts a spare tool (T) directly on and removes a spare tool (T) directly from the tool magazine (5) at the tool transfer station. The tool holding device (17) is shifted to a position on one side of the guide rail (12) and a spare tool (T) held on the tool holding device (17) is replaced with another spare tool (T) at the tool changing station.

8 Claims, 8 Drawing Sheets

SPARE TOOL CHANGING SYSTEM FOR MACHINING CENTER

BACKGROUND OF THE INVENTION

1. Field of the Invention

The present invention relates to a machining center and, more particularly, to a spare tool changing system for changing spare tools held in a tool magazine.

2. Description of the Related Art

Generally, a horizontal machining center has a horizontal spindle and a tool magazine supported on a frame on a level above the spindle. A plurality of spare tools are stored in a horizontal position in the tool magazine. An ATC (automatic tool changer) replaces a tool held on the spindle with a desired one of the spare tools. Spare tools which are not necessary for the present machining or damaged spare tools are replaced with different tools, removed from the tool magazine and carried outside the machining center.

A spare tool changing system for changing spare tools stored in a tool magazine is disclosed in JP-A No. 151539/1998 or JP-A No. 290339/1997. This prior art spare tool changing system takes out a spare tool from a tool magazine by an actuator, carries the spare tool in a horizontal position horizontally, transfers the spare tool in a horizontal position to a lifting device, lowers the lifting device to carry the spare tool to a tool changing station, replaces the spare tool with a different spare tool, and reverses those steps to carry the different spare tool to and store the same in the tool magazine.

Since this prior art spare tool changing system transfers the spare tool from the actuator to the lifting device, the spare tool changing system needs a special transfer mechanism and takes a long time for changing spare tools. Since the spare tool is held in a horizontal position all the time while the same is being carried, it is possible that the taper part of the spare part, comes off the lifting device, making a tool changing operation at the tool changing station difficult.

SUMMARY OF THE INVENTION

Accordingly, it is an object of the present invention to provide a spare tool changing system for a machining center, having a simple mechanism and capable of quickly, surely and easily changing spare tools.

According to a first aspect of the present invention, a spare tool changing system for a machining center provided with a tool magazine storing a plurality of spare tools in a horizontal position and disposed on a frame, to change the spare tools stored on the tool magazine includes a tool changer capable of putting a spare tool on and taking out the same from the tool magazine in a horizontal position; and a guide rail extending between a tool transfer station near the tool magazine and a tool changing station near a lower part of the frame to guide the tool changer for movement between the tool transfer station and the tool changing station.

In the spare tool changing system, it is preferable that the guide rail has a horizontal section for guiding the tool changer with the spare tool held in a horizontal position before the tool changer reaches the tool transfer station, a vertical section for guiding the tool changer with the spare tool held in a vertical position before the tool changer reaches the tool changing station, and a curved section for changing the direction of the tool changer, extending between the horizontal section and the vertical section.

In the spare tool changing system, it is preferable that the horizontal section is extended straight in a substantially horizontal plane on the frame, and the vertical section is extended straight in a substantially vertical plane on the frame.

In the spare tool changing system, it is preferable that the tool changer includes a carriage that travels along the guide rail, and a tool holding device supported so as to be movable on the carriage and capable of holding a spare tool.

It is preferable that the spare tool changing system further includes a tool holding device moving mechanism disposed near the tool transfer station and capable of moving the tool holding device supported on the carriage in directions perpendicular to and in directions parallel to the axis of the spare tool held on the tool holding device.

It is preferable that the spare tool changing system further includes a tool holding device shifting mechanism disposed near the tool changing station and capable of shifting the tool holding device supported on the carriage from the carriage in a direction perpendicular to the guide rail.

It is preferable that the spare tool changing system further includes a coupling mechanism for coupling the tool holding device and the carriage together while the tool changer is traveling, and a tool holding device releasing mechanism for releasing the tool holding device from the carriage at the tool transfer station and at the tool changing station.

The spare tool changing system according to the present invention is capable of quickly changing the spare tools by a simple mechanism by moving the tool changer directly between the tool transfer station and the tool changing station and of surely and easily achieving a tool changing work by altering the position of the spare tool to a vertical position at a position in front of the tool changing station.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
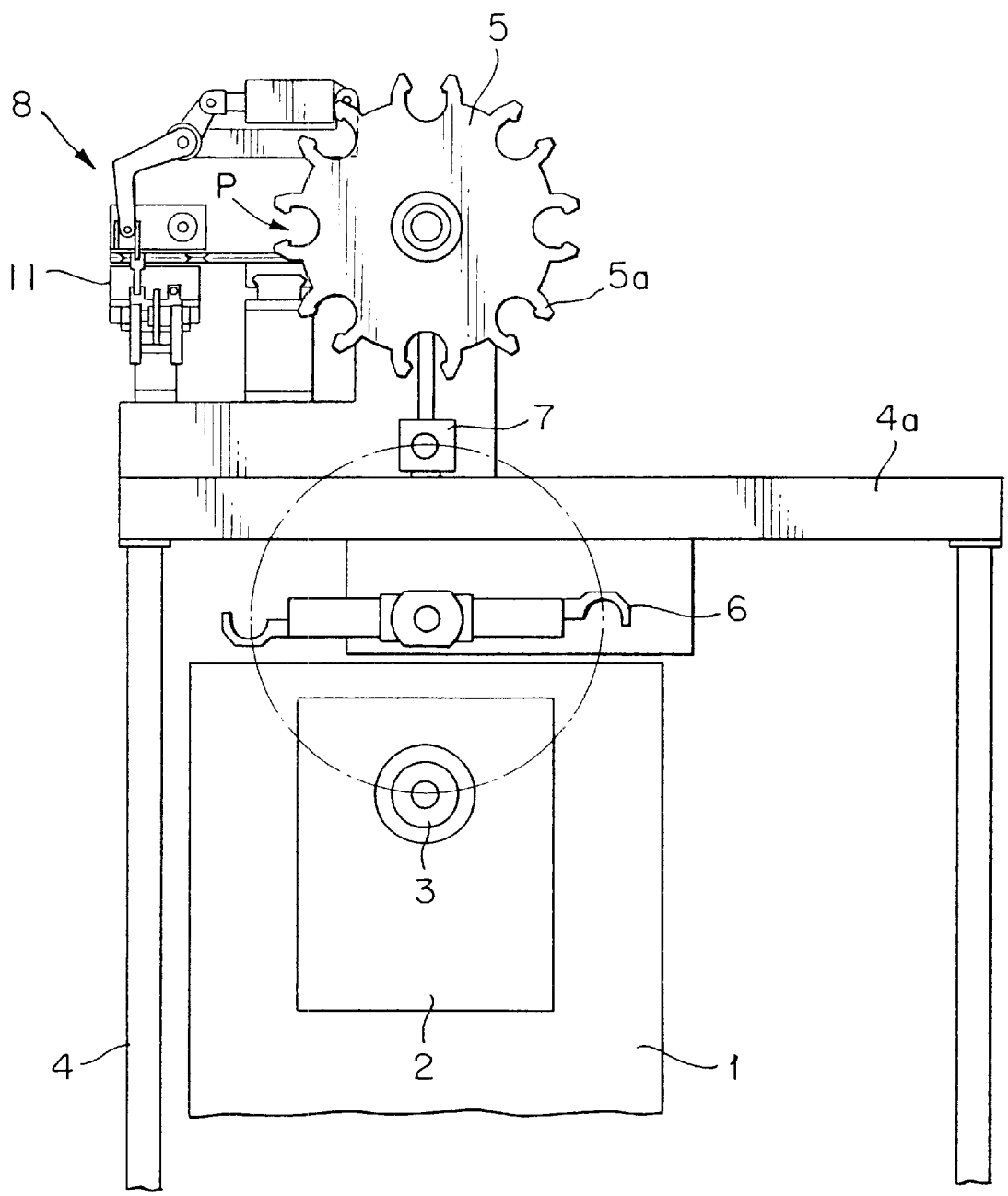
FIG. 1 is a front elevation of a horizontal machining center combined with a spare tool changing system in a first embodiment according to the present invention.

Referring to FIG. 1, a spindle head 2 is supported on a column 1 included in a horizontal machining center. A spindle 3 is supported horizontally on the spindle head 2. A forward tool magazine 5 is supported above the spindle 3 for turning about a longitudinal horizontal axis on a top wall 4a of a frame 4. The tool magazine 5 is provided in its peripheral part with a plurality of gripping parts 5a capable of gripping spare tools, not shown, in a horizontal position. An ATC (automatic tool changer) includes a tool changing arm 6 and a shifter 7 disposed between the tool magazine 5 and the spindle 3. A spare tool changing system 8 for automatically replacing spare tools stored in the tool magazine 5 with different tools is disposed on the left side, as viewed in FIG. 1, of the tool magazine 5.

Figure 2:
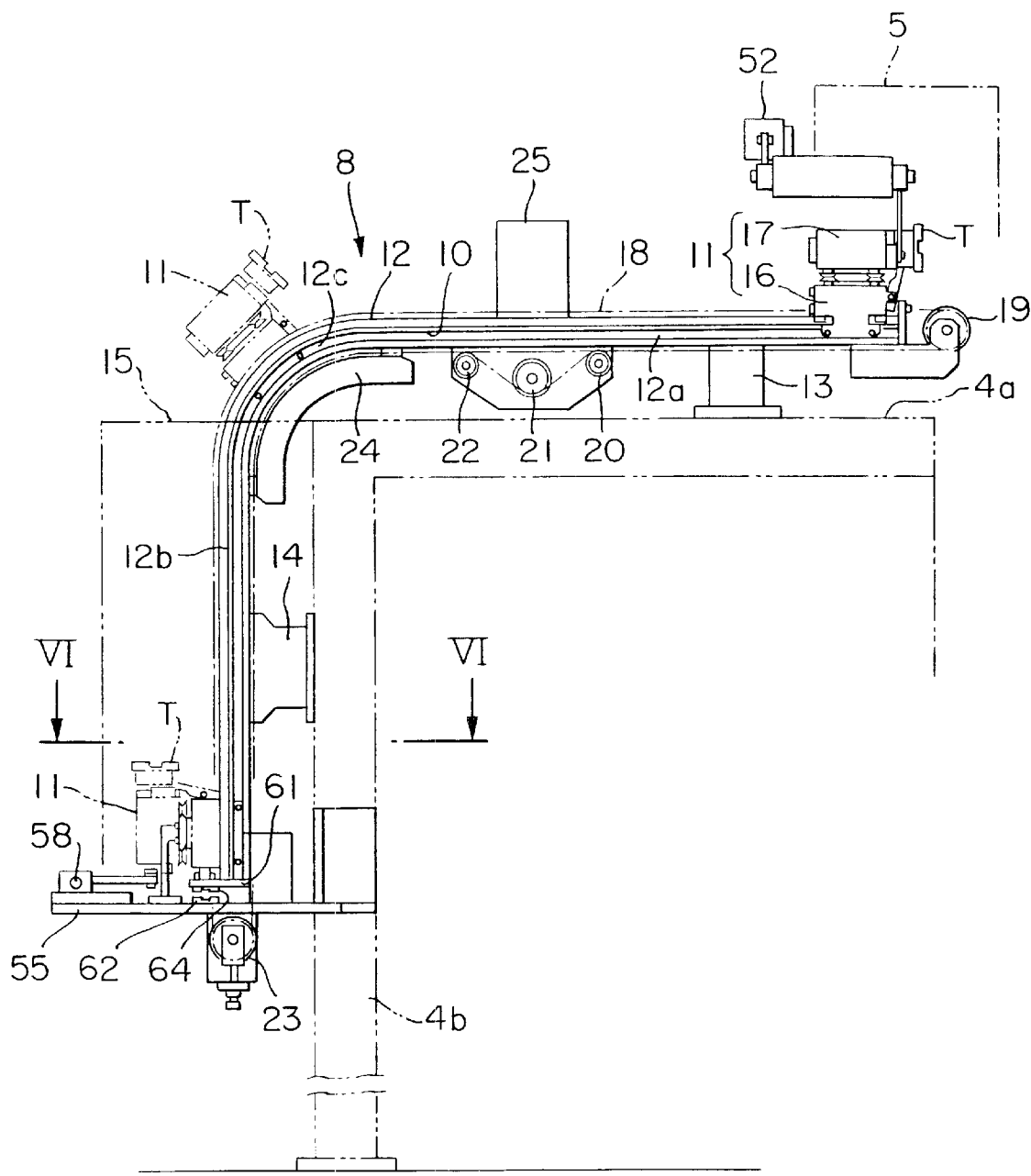
FIG. 2 is a left side elevation of the spare tool changing system in the first embodiment for use in combination with a forward tool magazine shown in FIG. 1.

Referring to FIG. 2, the spare tool changing system 8 includes a tool changer 1 for putting a spare tool T in and taking out the same from the tool magazine 5 in a horizontal position, and a guide rail for guiding the tool changer 11 from a tool transfer station near the tool magazine 5 to a tool changing station at a position near a lower part of the frame 4. Guide grooves 10 are formed in the entire length of the guide rail 12. The guide rail 12 has a horizontal section 12a extended straight backward from the tool transfer station in a horizontal plane, a vertical section 12b extended straight upward from the tool changing station in a vertical plane, and a curved section 12c extended between the horizontal section 12a and the vertical section 12b. The direction of the tool changer 11 changes as the tool changer 11 moves along the curved section 12c. The horizontal section 12a is supported on a bracket 13 fixed to the top wall 4a of the frame 4. The vertical section 12b is supported on a bracket 14 fixed to a back wall 4b of the frame 4. The vertical section 12b is covered with a protective cover 15 attached to the back wall 4b.

The horizontal section 12a may be extended in a plane slightly inclined to a horizontal plane, and the vertical section 12b may be extended in a plane slightly inclined to a vertical plane. In this embodiment, the tool changing station is located behind the machining center at a height that enables the operator to perform tool changing work in a standing position, such as a height in the range of 70 to 80 cm from the floor.

Figure 4:
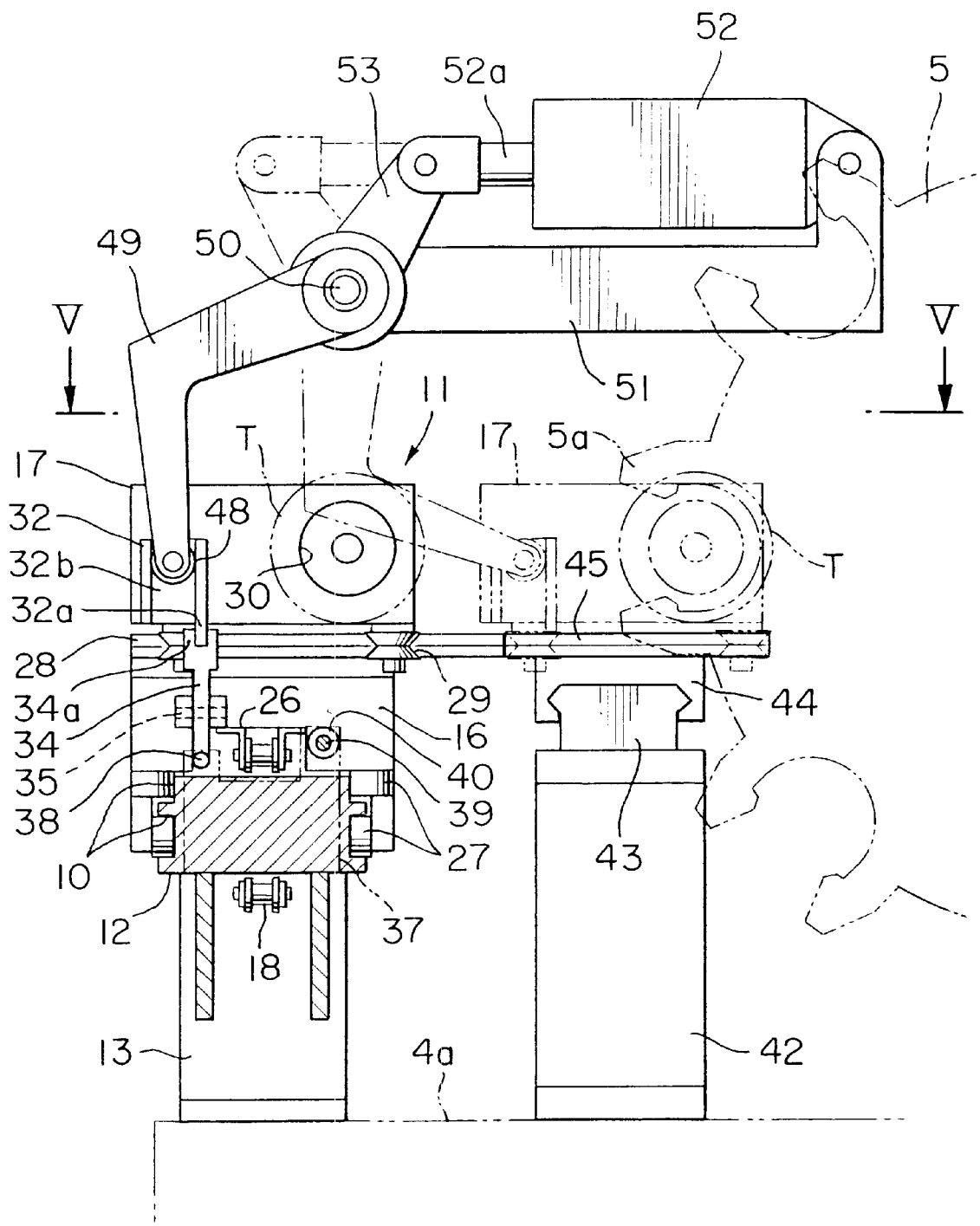
FIG. 4 is a sectional view taken on line IV—IV in FIG. 3.

The tool changer 11 has a carriage 16 that travels along the guide rail 12, and a tool holding device 17 capable of holding and releasing a tool. The tool changer 11 carries a spare tool T in a horizontal position along the horizontal section 12a and in a vertical position along the vertical section 12b. The carriage 16 is connected by a joint 26 to a chain 18 as shown in FIG. 4. The chain 18 is extended around sprockets 19, 20, 21, 22 and 23 on the guide rail 12. A chain guide 24 is disposed so as to extend along the curved section 12c of the guide rail 12. A geared motor 25 for driving the chain 18 is disposed in the horizontal section 12a. The geared motor 25 turns the chain in the normal and the reverse direction to move the tool changer 11 horizontally and vertically between the tool transfer station and the tool changing station.

Figure 3:
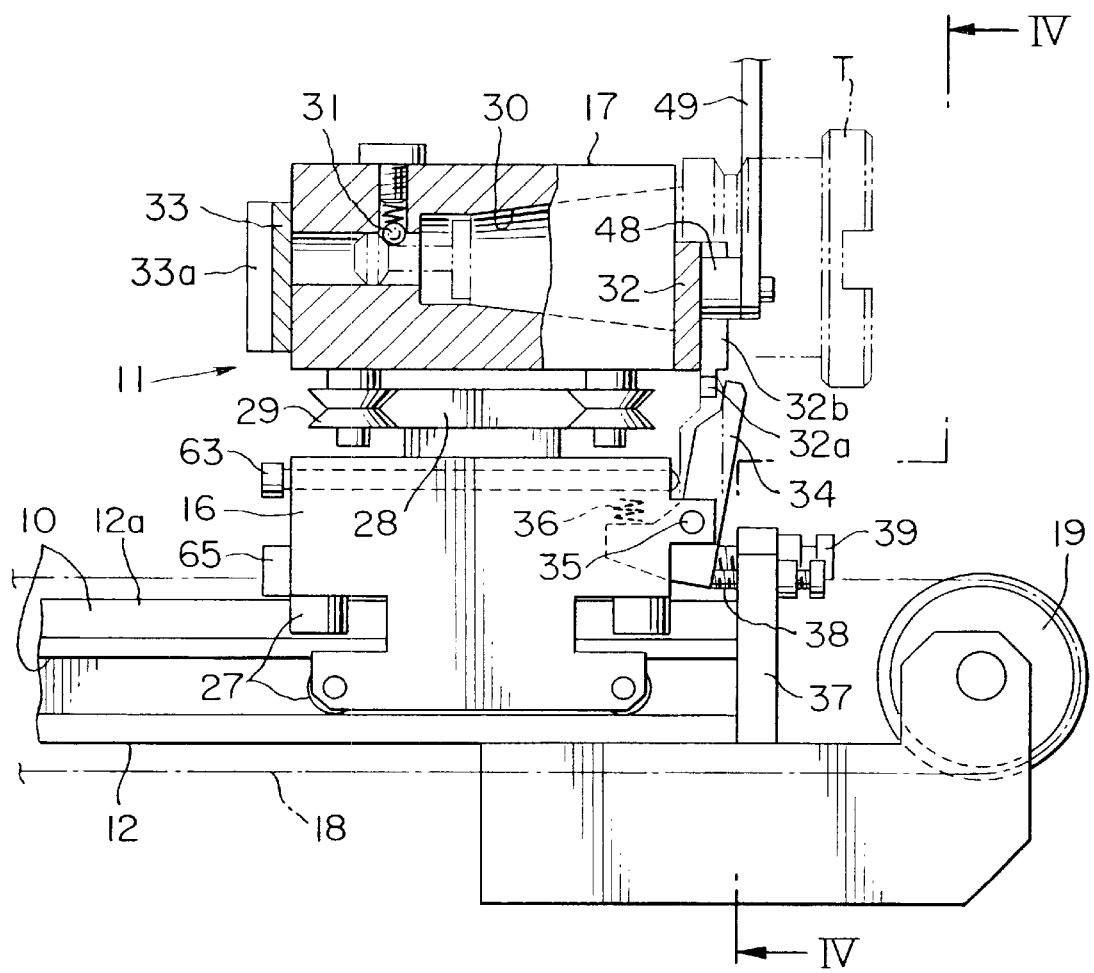
FIG. 3 is an enlarged side elevation of a tool changer included in the spare tool changing system shown in FIG. 2.

Referring to FIGS. 3 and 4, the carriage 16 is provided with rollers 27. The rollers 27 are set in the grooves 10. A long lateral rail 28 is fixed to the upper surface of the carriage 16. The tool holding device 17 is supported by rollers 29 on the rail 28 for movement on the carriage 16 in lateral directions perpendicular to the axis of the spare tool T. The tool holding device 17 is provided with a tool receiving hole 30, a tool stopping member 31, a front block 32 and a back block 33. A lever 34 is supported pivotally by a shaft 35 on a forward end part of the carriage 16 and is biased counterclockwise, as viewed in FIG. 3, by a spring 36. While the tool changer 11 is moving, a bifurcate upper end part 34a of the lever 34 is engaged with a lower end part 32a of the front block 32 to restrain the tool holding device 17 from lateral movement relative to the carriage 16.

An end plate 37 is attached to the front end of the guide rail 12. A bolt 38 is screwed in the end plate 37 so that a lower end of the lever 34 is able to collide against the bolt 38. As shown in FIG. 3, when the tool changer 11 is stopped at the tool transfer station, the lever 34 is turned clockwise by the bolt 38 so that the bifurcate upper end part 34a of the lever 34 is disengaged from the lower part 32a of the front block 32 to disengage the tool holding device 17 from the carriage 16. An adjustable stopper bolt 39 is screwed in the end plate 37. A rubber pad 40 is attached to the front end surface of the carriage 16 at a position corresponding to the stopper bolt 39. A stopping position where the carriage 16 is to be stopped at the tool transfer station can be finely adjusted by the stopper bolt 39.

Figure 5:
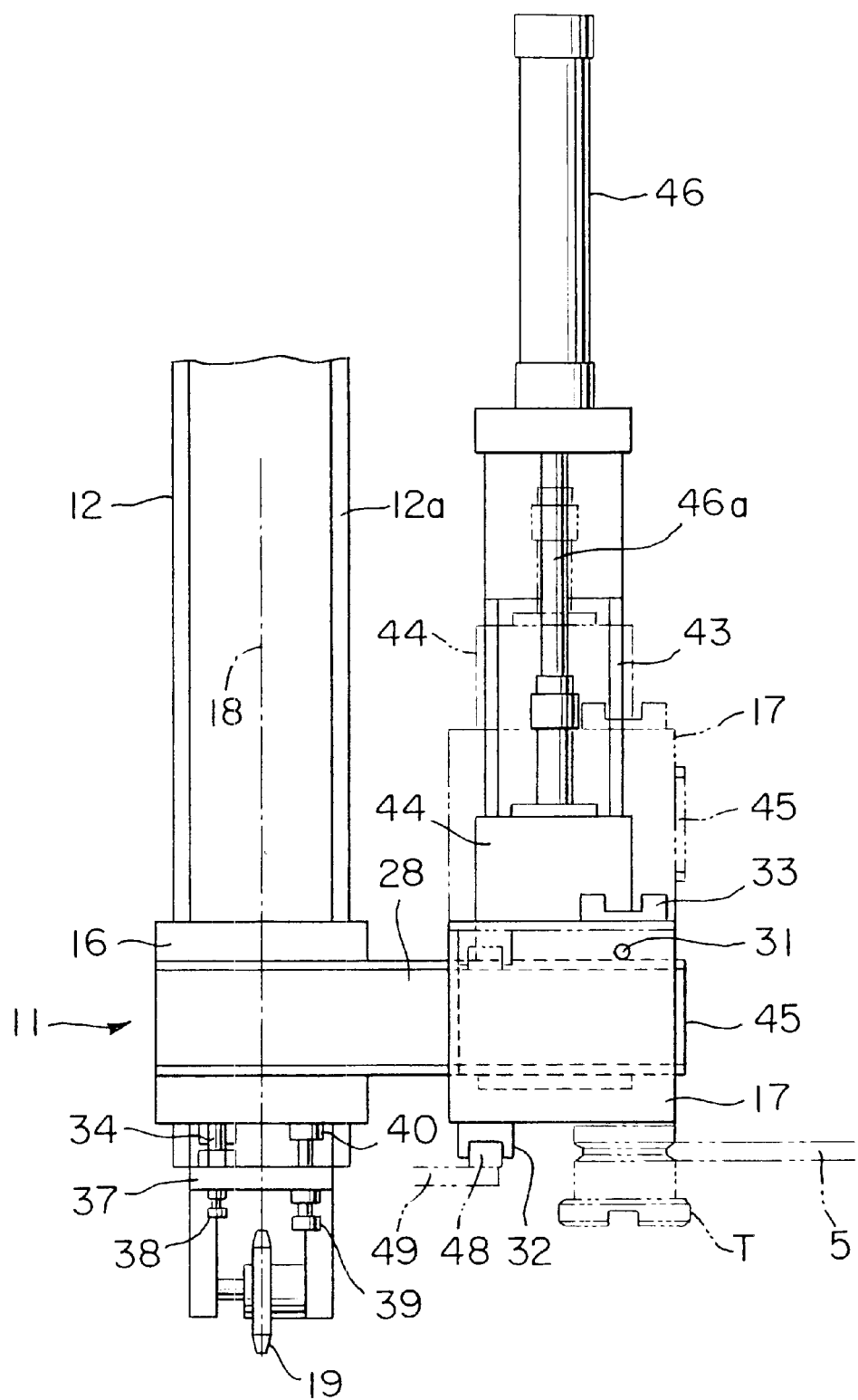
FIG. 5 is a plan view taken in the directions of the arrows along line V—V in FIG. 4.

Referring to FIGS. 4 and 5, a stand 42 is disposed between the tool magazine 5 and the guide rail 12 on the top wall 4a of the frame 4 and a longitudinal guide 43 is fixed to the stand 42. A slider 44 is supported on the guide 43 for movement in directions parallel to the axis of the spare tool T. An extension rail 45 of the same cross section as that of the rail 28 is fixed to the upper surface of the slider 44 so as to extend laterally. A cylinder actuator 46 having a piston rod 46a for driving the slider 44 is joined to the rear end of the guide 43. The piston rod 46a is moved axially to move the extension rail 45 between a tool mounting position where the rail 28 is aligned with the extension rail 45 and a tool releasing position (waiting position) on the back side of the tool mounting position. The stopping position of the carriage 16 is adjusted finely by the stopper bolt 39 so that the rail 28 can be aligned with the extension rail 45.

A vertical groove 32b is formed in the front block 32 of the tool holding device 17. When the tool changer 11 is located at the tool transfer station, a roller 48 attached to a lower end part of a substantially L-shaped arm 49 is received in the vertical groove 32b. An upper end part of the arm 49 is supported pivotally by a shaft 50 on a bracket 51. The bracket 51 is supported on a support frame, not shown, fixed to the top wall 4a of the frame 4. A cylinder actuator 52 having a piston rod 52a is supported on the bracket 51. The piston rod 52a is interlocked with the arm 49 by a link 53 and the shaft 50. In a state where the extension rail 45 of the slider 44 is aligned with the rail 28 of the carriage 16, the tool holding device 17 is shifted from the carriage 16 onto the slider 44 by stretching out the piston rod 52a to turn the arm 49 toward the tool magazine 5, and the tool holding device 17 is shifted from the slider 44 onto the carriage 16 by contracting the piston rod 52a to turn the arm 49 toward the guide rail 12. The rail 28, the slider 44, the extension rail 45, the cylinder actuator 46 and the cylinder actuator 52 constitute a mechanism for moving the tool holding device 17 in directions perpendicular to the axis of the spare tool T and in directions parallel to the axis of the spare tool T at the tool transfer station.

Figure 6:
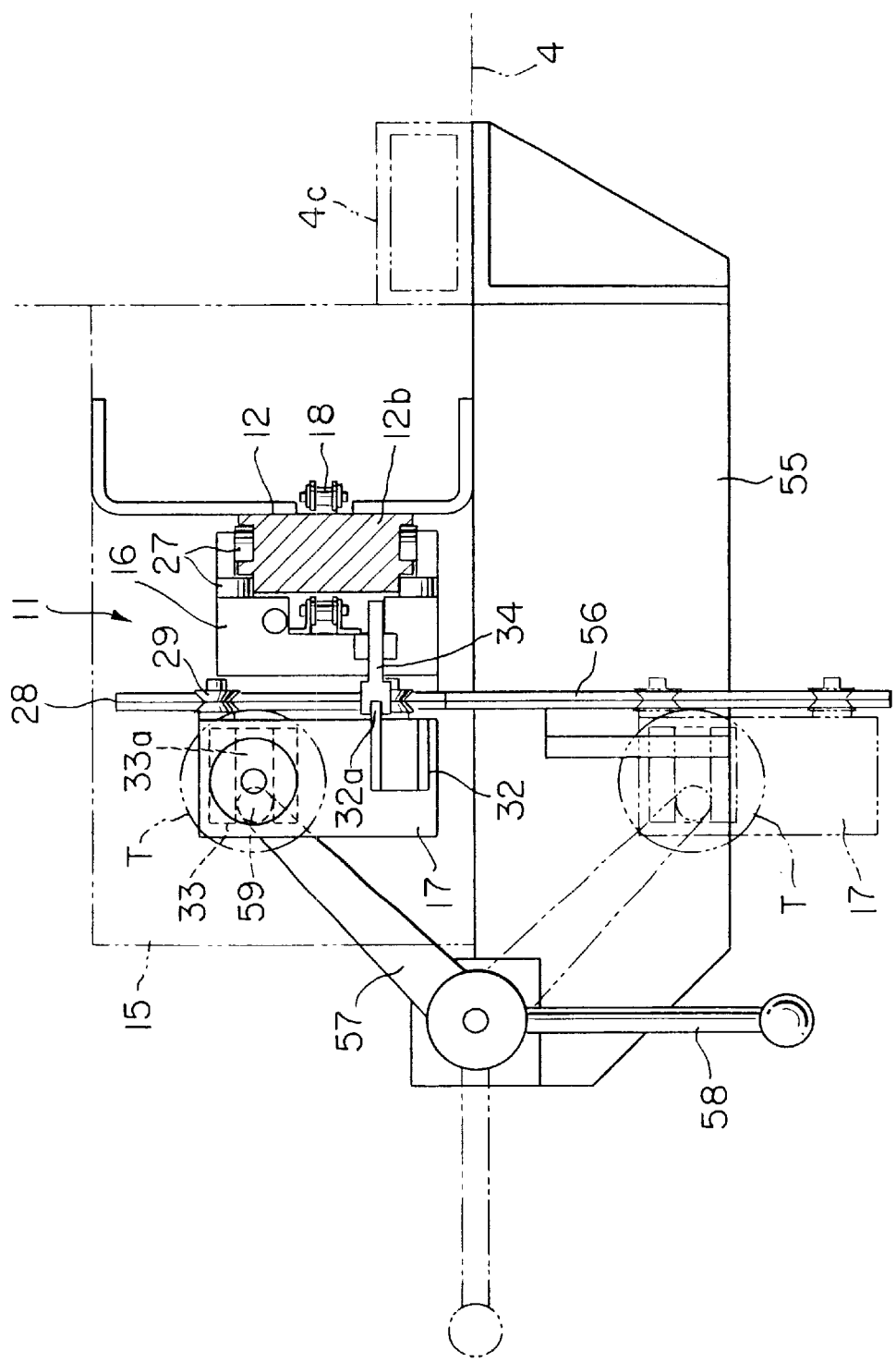
FIG. 6 is a sectional view taken on line VI—VI in FIG. 2.

Referring to FIG. 6, a table 55 is supported in a horizontal position on a support 4c of the frame 4. An extension rail 56 is fixed to a middle region of the upper surface of the table 55. The extension rail 56 has the same sectional shape as that of the rail 28. When the carriage 16 is stopped at the tool changing station, the rail 28 is aligned with the extension rail 56. An arm 57 having a handle 58 is supported pivotally on the upper surface of a rear end part of the table 55. A roller 59 is supported on a free end part of the arm 57. The back block 33 of the tool holding device 17 is provided with a vertical groove 33a (FIG. 3). When the tool changer 11 is located at the tool changing station, the roller 59 is received in the vertical groove 33. The handle 58 is turned in a direction from a position indicated by solid lines to a position indicated by two-dot chain lines with the roller 59 received in the vertical groove 33$a$ as shown in FIG. 6 to turn the arm 57 toward the table 55. Consequently, the tool holding device 17 is moved from the carriage 16 in a direction perpendicular to the guide rail 12. The tool holding device 17 can be returned onto the carriage 16 by turning the handle 58 in the opposite direction to turn the arm 57 toward the guide rail 12. The rail 28, the extension rail 56, the arm 57 and the handle 58 constitute a mechanism for moving the tool holding device 17 in a direction perpendicular to the guide rail 12 at the tool changing station. The mechanism may be automated by incorporating a cylinder actuator or a motor into the mechanism.

As shown in FIGS. 2 and 3, a lower end plate 61 is attached to the lower end of the guide rail 12. The lower end plate 61, similarly to the front end plate 37, is provided with a bolt 62 and a sliding pin 63 is extended through the carriage 16. When the tool changer 11 is stopped at the tool changing station, the sliding pin 63 is pushed by the bolt 62, and the sliding pin 63 pushes the lever 34. Consequently, the lever 34 is disengaged from the lower end part 32$a$ of the front block 32 to release the tool holding device 17 from the carriage 16. A stopper bolt 64 is screwed in the lower end plate 61 and a rubber pad 65 is attached to the back end surface of the carriage 16 at a position corresponding to the stopper bolt 64. The stopping position of the carriage 16 at the tool changing station is adjusted finely by the stopper bolt 64 so that the rail 28 can be aligned with the extension rail 56.

The operation of the spare tool changing system 8 thus constructed will be explained hereinafter. Referring to FIG. 5, in a state where the tool changer 11 is located at the tool transfer station, the carriage 16 is stopped at the front end of the guide rail 12, the tool holding device 17 is moved backward to the tool releasing position indicated by two-dot chain lines after transferring the spare tool T to a predetermined tool gripping part 5$a$ of the tool magazine 5. When a tool changing command is given in this state, the tool gripping part 5$a$ holding a specified unnecessary spare tool T is located at a tool changing position P, and the cylinder actuator 46 advances the slider 44 to align the extension rail 45 with the rail 28 of the carriage 16. Consequently, the taper shank of the unnecessary spare tool T is received in the tool receiving hole 30 of the tool holding device 17 and the unnecessary spare tool T is held by the tool holding device 17. Subsequently, the cylinder actuator 52 turns the arm 49 toward the guide rail 12 as shown in FIG. 4 to shift the tool holding device 17 from the slider 44 onto the carriage 16. Thus, the unnecessary spare tool T is removed in a horizontal position from the gripping part 5$a$ of the tool magazine 5. Then, as shown in FIG. 2, the geared motor 25 is actuated to drive the chain 18. The tool changer 11 is moved backward along the horizontal section 12$a$ of the guide rail 12 to carry the unnecessary spare tool T in a horizontal position toward the back side of the machining center. The direction of the tool changer 11 changes as the tool changer 11 moves along the curved section 12$c$ and, eventually, the unnecessary spare tool T is turned to a vertical position. The tool changer 11 is further moved downward along the vertical section 12$b$ holding the unnecessary spare tool T in a vertical position to the tool changing station. While the tool changer 11 is moved along the guide rail 12, the lever 34 is engaged with the lower end part 32$a$ of the front block 32 as indicated by two-dot chain lines in FIG. 3 to restrain the tool holding device 17 from lateral movement relative to the carriage 16.

Upon the stoppage of the tool changer 11 at the tool changing station, the bolt 62 pushes the sliding pin 63 to disengage the lever 34 from the lower end part 32$a$ of the front block 32 and, as shown in FIG. 6, the rail 28 of the carriage 16 is aligned with the extension rail 56 of the table 55. In this state, the operator operates the handle 58 to turn the arm 57 to shift the tool holding device 17 from the carriage 16 onto the table 55. Then, the unnecessary spare tool T is removed from the tool holding device 17 and a desired spare tool T is mounted on the tool holding device 17. Even if the carriage 16 is moved by some cause, the operator is able to carry out the tool changing work safely at a position apart from the guide rail 12.

After the completion of the tool changing work, the handle 58 is turned in the reverse direction to return the tool holding device 17 from the table 55 to the carriage 16 and the geared motor 25 is reversed. Consequently, as shown in FIG. 2, the chain 18 is turned in the reverse direction, the lever 34 is engaged with the front block 32 to restrain the tool holding device 17 from movement relative to the carriage 16, the tool changer 11 moves up toward the upper part of the machining center along the vertical section 12$b$ with the desired spare tool T held in a vertical position. The direction of the tool changer 11 changes as the tool changer 11 moves along the curved section 12$c$ and, eventually, the desired spare tool T is turned to a horizontal position. The tool changer 11 moves further along the horizontal section 12$a$ to the tool transfer station, holding the desired spare tool T in a horizontal position.

When the tool changer 11 is stopped at the tool transfer station as shown in FIG. 3, the lever 34 is disengaged from the lower end part 32$a$ of the front block 32, the arm 49 is turned toward the tool magazine 5 by the cylinder actuator 52 as shown in FIG. 4 to transfer the tool holding device 17 from the rail 28 of the carriage 16 onto the extension rail 45 of the slider 44 to mount the desired spare tool T in a horizontal position on the gripping part 5$a$ of the tool magazine 5. Then, as shown in FIG. 5, the slider 44 is moved backward by the cylinder 46 to separate the taper shank of the desired spare tool T from the tool receiving hole 30 and to locate the vacant tool holding device 17 at the waiting position. Thus, a procedure for replacing one unnecessary spare tool T with a desired spare tool T is completed.

The tool changer 11 of the spare tool changing system 8 holding a spare tool T moves directly between the tool transfer station and the tool changing station. Therefore, the spare tool T does not need to be transferred from one to another while the same is being carried, any special transfer mechanism is not necessary and the spare tool changing operation can be quickly carried out. Since the spare tool T is carried in a vertical position along the vertical section 12$b$, The spare tool T never comes off the tool holding device 17 and is held securely on the tool holding device 17. The operator is able to replace a spare tool T easily with another spare tool T at the tool changing station by using the weight of the spare tools T. Since the tool changer 11 is constructed so that the tool holding device 17 can be moved relative to the carriage 16, a spare tool T can be directly put on and removed from the tool magazine 5 by quickly moving only the tool holding device 17 at the tool transfer station, and a spare tool T held by the tool holding device 17 can be safely replaced with another one at a position spaced apart from the path of the tool changer 11.

Although the spare tool changing system 8 in this embodiment uses the special mechanism including the slider 44 and the cylinder actuator 46 for putting a spare tool T on and removing the same from the tool magazine 5, a spare tool T may be put on and removed from the tool magazine 5 by advancing and retracting the carriage 16 at the tool transfer station by the tool changer driving mechanism including the chain 18 and the geared motor 25. Although the present invention has been describe in the spare tool changing system as used in combination with the tool magazine 5 capable of turning about a longitudinal axis, the present invention is applicable also to a spare tool changing system to be used in combination with a tool magazine capable of turning about a lateral axis.

Figure 7:
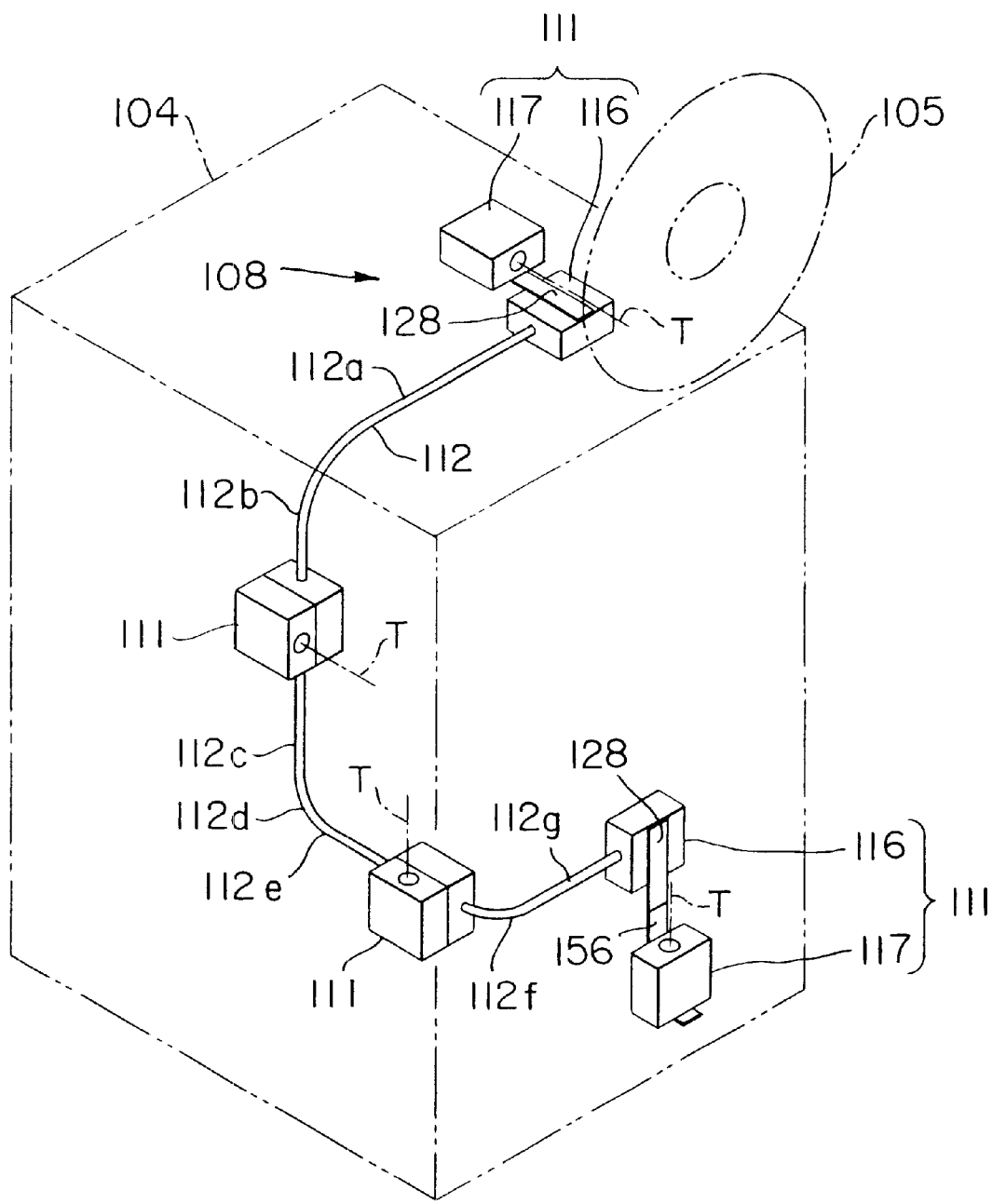
FIG. 7 is a perspective view of a spare tool changing system in a second embodiment according to the present invention for use in combination with a lateral tool magazine.

FIG. 7 shows a spare tool changing system 108 in a second embodiment according to the present invention for use in combination with a lateral tool magazine 105. The spare tool changing system 108 includes a guide rail 112 having a horizontal section 112a extending from a tool transfer station near the tool magazine 105, a curved section 112b, a vertical section 112c, a curved section 112d, a horizontal section 112e, a curved section 112f and a horizontal section 112g extending to a tool changing station at a lower part of a frame 4. The horizontal section 112a, the curved section 112b and the vertical section 112c form a horizontal guide section apart from the tool changing station, that guides a tool changer 111 in a position to hold a spare tool T in a horizontal position. The horizontal section 112e, the curved section 112f and the horizontal section 112g form a vertical guide section that guides the tool changer 111 in a position to hold a spare tool T in a vertical position. The direction of the tool changer 111 changes while the same moves along the curved section 112d extended between the horizontal guide section and the vertical guide section.

The tool changer 111 has a carriage 116 that travels along the guide rail 112, and a tool holding device 117 that holds a spare tool T. A rail 128 is fixed to the carriage 116 so as to extend perpendicularly to the guide rail 112. The tool holding device 117 moves along the rail 128 relative to the carriage 116 in lateral directions parallel to the axis of the spare tool T. The tool changer 111 is able to put a spare tool T on and remove the same from the tool magazine 105 in a horizontal position by moving the carriage 116 and the tool holding device 117 together in longitudinal directions and moving the tool holding device 117 in lateral directions at the tool transfer station. In the second embodiment, a chain 18 (FIG. 2) for moving the carriage 116 and a cylinder actuator 52 (FIG. 4) for moving the tool holding device 117 constitute a mechanism for moving the tool holding device 117 in directions parallel to the axis of the spare tool T and in directions perpendicular to the axis of the spare tool T at the tool transfer station. An extension rail 156 is extended vertically on a part of a frame 104 corresponding to the tool changing station so as to be connected to the lower end of the rail 128 of the carriage 116. Thus, the tool holding device 117 can be separated downward from the guide rail 112 by manually or automatically operating a tool holding device operating mechanism, not shown. The rail 128, the extension rail 156 and the tool holding device operating mechanism constitute a mechanism for separating the tool holding device 117 from the guide rail 112 at the tool changing station in a direction perpendicular to the guide rail 112.

Figure 8:
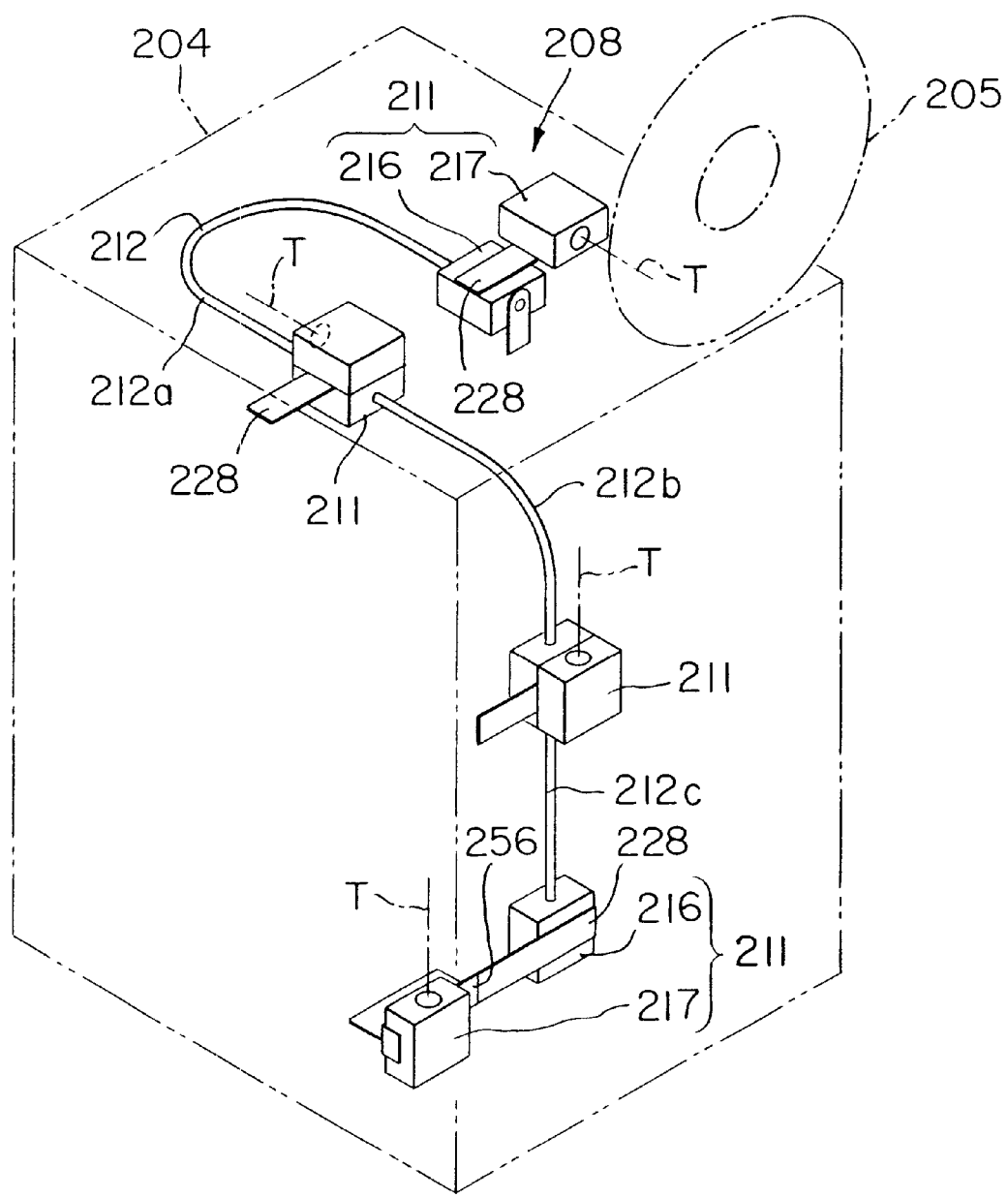
FIG. 8 is a perspective view of a spare tool changing system in a third embodiment according to the present invention for use in combination with a lateral tool magazine.

FIG. 8 shows a spare tool changing system 208 in a third embodiment according to the present invention for use in combination with a lateral tool magazine 205. The spare tool changing system 208 includes a guide rail 212 having a horizontal U-shaped section 212a extending in a horizontal plane from a tool transfer station, a straight vertical section 212c extending upward from a tool changing station, and a curved section 212b interconnecting the U-shaped section 212a and the vertical section 212c. The U-shaped section 212a forms a horizontal guide section extending from the tool transfer station to guide a tool changer 211 holding a spare tool T in a horizontal position. The vertical section 212c forms a vertical guide section extending from the tool changing station to guide the tool changer 211 holding the spare tool T in a vertical position. The curved section 211b between the horizontal guide section and the vertical guide section changes the direction of the tool changer 211.

The tool changer 211 has a carriage 216 that travels along the guide rail 212 and a tool holding device 217 that holds a spare tool T. A rail 228 is fixed to the carriage 116 so as to extend perpendicularly to the guide rail 212. The tool holding device 217 moves along the rail 228 relative to the carriage 216 in longitudinal directions perpendicular to the axis of the spare tool T. The tool changer 211 is able to put a spare tool T on and remove the same from the tool magazine 205 in a horizontal position by moving the carriage 216 and the tool holding device 217 together in lateral directions and moving the tool holding device 217 in longitudinal directions at the tool transfer station. In the third embodiment, a chain 18 (FIG. 2) for moving the carriage 216 and a cylinder actuator 52 (FIG. 4) for moving the tool holding device 217 constitute a mechanism for moving the tool holding device 217 in directions parallel to the axis of the spare tool T and in directions perpendicular to the axis of the spare tool T at the tool transfer station. An extension rail 256 is extended horizontally on a part of a frame 204 corresponding to the tool changing station so as to be connected to the front or the back end of the rail 228 of the carriage 216. Thus, the tool holding device 217 can be separated laterally from the guide rail 212 by manually or automatically operating a tool holding device operating mechanism, not shown. The rail 228, the extension rail 256 and the tool holding device operating mechanism constitute a mechanism for separating the tool holding device 217 from the guide rail 212 at the tool changing station in a direction perpendicular to the guide rail 212.

In the foregoing embodiments, the respective carriages 16, 116 and 216 of the tool changers 11, 111 and 211 may be of a self-propelled type provided with a motor for driving the rollers disposed in contact with the opposite sides of the guide rail. Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A spare tool changing system for a machining center provided with a tool magazine storing a plurality of spare tools, a one of said plurality of spare tools having a major axis which is horizontal when in the tool magazine, said one of said plurality of spare tools being disposed on an upper part of a frame above a column having a spindle, in which system, a tool on the spindle is replaced with said one of said plurality of spare tools stored on the tool magazine, said system comprising:

a tool changer for putting said one of said plurality of spare tools on the tool magazine and taking out said one of said plurality of spare tools from the tool magazine disposed on an upper part of the frame, the tool changer being adapted to take out said one of said plurality of spare tools from the tool magazine before the tool changer reaches a tool changing station at a lower part of the frame; and a guide rail having a horizontal section, a vertical section, and a curved section, said guide rail extending between a tool transfer station at the tool magazine and the tool changing station at the lower part of the frame to guide the tool changer for movement between the tool transfer station and the tool changing station, wherein said horizontal section extends from said tool transfer station and is adapted to guide the tool changer with said major axis of said one of said plurality of spare tools being horizontal, said vertical section being adapted to guide the tool changer to said tool changing station with said major axis of said one of said plurality of spare tools being vertical, said curved section connecting the horizontal section and the vertical section, said curved section being used for changing the direction of said major axis of said one of said plurality of spare tools from horizontal to vertical and vertical to horizontal.

2. The spare tool changing system according to claim 1, wherein the horizontal section is extended straight in a substantially horizontal plane on the frame, and the vertical section is extended straight in a substantially vertical plane on the frame.

3. The spare tool changing system according to claim 1, wherein the tool changer includes a carriage that travels along the guide rail, and a tool holding device supported so as to be movable on the carriage and capable of holding a spare tool.

4. The spare tool changing system according to claim 3, further comprising a tool holding device moving mechanism disposed at the tool transfer station and capable of moving the tool holding device supported on the carriage in directions perpendicular to and in directions parallel to an axis of said one of said plurality of spare tools held on the tool holding device.

5. The spare tool changing system according to claim 3, further comprising a tool holding device shifting mechanism disposed at the tool changing station and capable of shifting the tool holding device supported on the carriage from the carriage in a direction perpendicular to said major axis of said one of said plurality of spare tools.

6. The spare tool changing system according to claim 3, further comprising a coupling mechanism for coupling the tool holding device and the carriage together while the tool changer is traveling; and a tool holding device releasing mechanism for releasing the tool holding device from the carriage at the tool transfer station and the tool changing station.

7. A spare tool changing system for a machining center comprising:

a tool magazine for storing a plurality of spare tools, wherein said tool magazine is being disposed on an upper part of a frame above a column having a spindle;

a tool changer for putting a one of said plurality of spare tools on said tool magazine and taking out said one of said plurality of spare tools from said tool magazine, said one of said plurality of spare tools having a major axis which is horizontal when in said tool magazine; and a guide rail having a horizontal section, a vertical section, and a curved section, said guide rail extending between a tool transfer station at said tool magazine and a tool changing station at a lower part of said frame, wherein said horizontal section extends from said tool transfer station and is adapted to guide said tool changer with said major axis of said one of said plurality of spare tools being horizontal, said vertical section being adapted to guide said tool changer with said major axis of said one of said plurality of spare tools being vertical, said curved section connecting the horizontal section and the vertical section.

8. The spare tool changing system according to claim 7, wherein said vertical section is adapted to guide said tool changer to said tool changing station with said major axis of said one of said plurality of spare tools being vertical.

* * * * *